(12) United States Patent
Peto

(10) Patent No.: US 9,887,738 B2
(45) Date of Patent: Feb. 6, 2018

(54) ELECTRICAL SYSTEM ADAPTED TO TRANSFER DATA AND POWER BETWEEN DEVICES ON A NETWORK

(71) Applicant: Powdac Limited, Dorset (GB)

(72) Inventor: Raymond Peto, Dorchester (GB)

(73) Assignee: POWDAC LIMITED, Dorset (GB)

( * ) Notice: Subject to any disclaimer, the term of this patent is extended or adjusted under 35 U.S.C. 154(b) by 451 days.

(21) Appl. No.: 14/402,229

(22) PCT Filed: May 22, 2013

(86) PCT No.: PCT/GB2013/000235
§ 371 (c)(1),
(2) Date: Nov. 19, 2014

(87) PCT Pub. No.: WO2013/175163
PCT Pub. Date: Nov. 28, 2013

(65) Prior Publication Data
US 2015/0130270 A1    May 14, 2015

(30) Foreign Application Priority Data

May 22, 2012  (GB) .................................. 1208964.5

(51) Int. Cl.
*H04L 12/10*   (2006.01)
*H04B 3/54*    (2006.01)
*H04L 5/20*    (2006.01)

(52) U.S. Cl.
CPC ............. *H04B 3/548* (2013.01); *H04L 12/10* (2013.01); *H04B 2203/5445* (2013.01); *H04B 2203/5483* (2013.01); *H04L 5/20* (2013.01)

(58) Field of Classification Search
CPC .................................. H04L 12/10; H04L 5/20
See application file for complete search history.

(56) References Cited

U.S. PATENT DOCUMENTS

| | | | | | |
|---|---|---|---|---|---|
| 4,173,714 | A | * | 11/1979 | Bloch | H04B 3/44 370/200 |
| 4,583,214 | A | * | 4/1986 | Miyashita | H04M 9/003 370/200 |
| 4,733,389 | A | * | 3/1988 | Puvogel | H04L 12/40045 370/200 |
| 5,994,998 | A | * | 11/1999 | Fisher | H04B 3/542 340/12.3 |
| 6,640,308 | B1 | * | 10/2003 | Keyghobad | G05B 19/042 370/254 |
| 2006/0078093 | A1 | * | 4/2006 | Karam | H04L 1/22 379/24 |

(Continued)

*Primary Examiner* — Rexford Barnie
*Assistant Examiner* — David Shiao
(74) *Attorney, Agent, or Firm* — William H. Bollman

(57) ABSTRACT

This invention relates to an electrical system which enables peripheral devices to communicate exclusively of other AC and power transceivers which provide to the electrical system and receive from the electrical system power and signals. The invention is an electrical system that comprises network channels (1000, 2000) connected by circuits (100, 200). Peripheral devices plugged into the network channels communicate with each other. AC and power transceivers connected to the circuits communicate with each other and distribute power through the network channels.

15 Claims, 11 Drawing Sheets

(56) References Cited

U.S. PATENT DOCUMENTS

| | | | |
|---|---|---|---|
| 2006/0159186 A1* | 7/2006 | King | H04L 5/20 375/258 |
| 2006/0215339 A1* | 9/2006 | Camagna | H04L 12/10 361/90 |
| 2007/0047525 A1* | 3/2007 | He | H04L 12/10 370/352 |
| 2011/0055598 A1 | 3/2011 | Yu | |
| 2013/0054724 A1* | 2/2013 | Yundt | H04L 12/40182 709/208 |
| 2013/0173939 A1 | 7/2013 | Peto | |
| 2014/0036653 A1* | 2/2014 | Moons | H04L 5/20 370/200 |

\* cited by examiner

ELECTRICAL SYSTEM ADAPTED TO TRANSFER DATA AND POWER BETWEEN DEVICES ON A NETWORK

FIELD OF THE INVENTION

This invention relates generally to an electrical system and more particularly, but not exclusively to an electrical system adapted to transfer data and power between devices on a network.

BACKGROUND

A consequence of the modern age of electrical and electronic devices is that the wiring of modern homes and offices often comprise wired networks for connecting these devices. Unfortunately these built in wired networks are limited to the transfer of data to and from these peripheral devices. Attempts have been made to allow a modest amount of unidirectional DC power to be provided over the same cables.

PRIOR ART

Incremental progress has been made to upgrade wired networks by making use of the original wire in the network.

One example in such incremental progress is revealed by International patent application WO 2012/032293 wherein a combined electrical and optical signal and power transmission system is revealed.

Another example of such incremental progress is revealed by U.S. Pat. No. 5,148,144 (Sutterlin et al). It reveals an existing channel that provides for AC communications between two peripheral devices.

It also reveals how the channel can be upgraded to transfer DC power. The channel consists of parallel wires connected to transformers. A DC power source in the form of a battery provides the power. It is shown connected to a centre tap on one of secondary coils. A DC power user is shown in the form of DC/DC converter. It takes power from the centre tap of the other primary coil. Transfer of DC power this way is useful, but there is no indication of transmitting additional AC signals or power over the existing channel.

US2011/0055598 discuss the "power over Ethernet" standard. This is another approach for transferring power over existing wired networks. It makes use of complicated "POE" chips and chipsets that this standard requires and may be considered an active system. Texas Instruments Inc technical document SLVS885D reveals that "POE" is useful; however POE chips are programmable which adds a significant level of complexity.

The POE chips need power to operate which decrease the power efficiency of the network. The POE chipset uses different values of resistance to present a current in response to applying a voltage. This resistance measuring protocol allows the transmitting chip to identify the power requirement of the unit connected to the other end of the cable. It is also only a one way power transmission medium. It is also limited to only a nominal 48 volt system. The other main disadvantage of the POE system is that the existing exposed pins of the 8 way Cat5 8P8C connector both carry the existing 100BASE-T and the POE 48 volt power. Unfortunately exposed pins can be inadvertently shorted, or the 8 way Cat5 8P8C connector can be inadvertently connected to a peripheral which cannot cope with POE 48 volt power. To prevent inadvertent damage or harm the power on the exposed pins could cause, the POE system employs sophisticated circuitry.

In light of the foregoing prior art, there is a need for a simple and passive means to upgrade channels that provide for AC communications between two peripheral devices so that it is now possible to distribute a significant amount of electrical power in either direction efficiently while allowing for the simultaneous connection of a multitude of electronic and electrical devices as well.

The invention is as defined in the claims which are elucidated by the explanation below.

SUMMARY OF THE INVENTION

According to the first aspect of the invention, an electrical system for transmission of data or electrical power between electrical devices connected to the system, comprising: a first transformer and a second transformer having respective secondary coils connected by a first channel; a third transformer and fourth transformer having respective secondary coils connected by a second channel, each transformer having respective primary coils comprising terminals for connecting with electrical devices connected to the system and receiving or transmitting data to or from the devices; a centre-tap on the first transformer secondary coil connected through a first electrical circuit to a centre-tap on the third transformer secondary coil; and a centre-tap on the second transformer secondary coil connected through a second electrical circuit to a centre-tap on the fourth transformer secondary coil, wherein each of the first and second electrical circuits comprise at least one feed for transferring data or power into the system from a source of data or power or receiving data or power from the system through the centre-taps of the secondary coils of the transformers.

The transformers may be configured to receive data from or transmit data to electrical devices connected to the system through a transmit or receive transformer of the electrical devices.

Each of the first and second electrical circuits may comprise an inductor or a capacitor arranged with said at least one feed to allow power or data to be transferred into or from the system through the centre taps of the first to fourth transformers.

There may be an inductor and a capacitor arranged with said at least one feed to allow power and data to be transferred into or from the system through the centre taps of the first to fourth transformers.

The inductor and capacitor may be arranged in series and the system comprises a first feed and a second feed connected with the inductor and capacitor for transmitting data and receiving data through the centre-taps, and a third feed which is connected with the second feed, the inductor and capacitor for transmitting power through the centre-taps.

The first feed may be used for low frequency one or two way data communications for functional items such as thermostats, timers, emergency buttons, lighting control, doorbells, door entry systems etc, or for one or two way direct audio frequency transmission for functional items such as baby monitors, intercoms and internal private telephone systems.

The second feed may be used either to input or output power from the system and hence provide power to, for example, USB outlets via a 48 to 5 volt down converter, to provide power to operate peripheral devices that are plugged into the system such as computers, printers and televisions. Such two way power distribution allows for batteries or other power sources in the system to act as power sources for the system, other power transceivers and peripherals as required.

Use of feeds one and two together enable supply and take off of both AC signals and AC and/or DC power simultaneously through the first and second circuits.

The third feed is used to provide the return path of both the second feed and the first feed. Alternatively the second feed may be used in conjunction with the first feed for the supply and take off of the AC feed.

In one embodiment the first and second circuits also include a respective high frequency inductor connected to the input of each respective inductor and an identical respective high frequency inductor connected to the output of each respective capacitor. These high frequency inductors have the advantage of providing extra isolation between the peripheral data and the internal relatively low frequency first and second feeds impressed on the cable carrying the peripheral data. They enhance the common mode rejection of the impressed first and second feeds with respect to the peripheral data.

Preferably a first signal transceiver is connected to the second feed and to the first feed of the first circuit and a second signal transceiver connected to the second feed and to the first feed of the second circuit. This electrical system enables the first signal transceiver to communicate with the second signal transceiver. Advantageously this communication is unhindered by other signals in the first channel between the first and second transformers. Also advantageously this communication is unhindered by other signals in the second channel between the third and fourth transformers.

Preferably the first signal transceiver is connected to the third feed as well thereby providing an electrical return path. A skilled person understands that a signal transceiver provides and receives power as well as signals.

The electrical system comprises a first signal transceiver that is connected to the first circuit by a first connection to a series capacitor which is in turn connected to the first feed, and that is connected by a second connection to the third feed. Advantageously this first may be one that sends and/or receives audio frequency signals thereby enabling audio communications. Preferably the first signal transceiver is connected to the third feed as well thereby providing an electrical return path. In one embodiment the third feed is connected to an electrical earthing ground thereby providing for electrical safety. Therefore an advantage of the electrical system is that AC electrical power can be transceived between the first signal transceiver and the second signal transceiver.

In a particularly preferred embodiment the electrical system includes a signal conditioning module that is connected to the third feed and to the second feed and to the first feed of the first circuit; the conditioning module comprising terminals for connecting to an electrical device.

Advantageously the signal conditioning module changes a standard data stream input into a data stream format, for example Manchester coding, suitable for transmission within the system, so that where this data stream is reconverted and outputted from another signal conditioning module operating in the reverse mode the output has reverted to the standard data stream format again to become the data stream output. The signal conditioning module as described may operate either in one direction or both directions according to requirement. Therefore the signal conditioning module has a higher level capability than a simple power source or signal transceiver.

In another embodiment the electrical system comprises a first power transceiver that is connected to the third feed and to the second feed of the first circuit and a second power transceiver that is connected to the third feed and to the Second feed of the second circuit. Advantageously this electrical system enables DC power to be supplied from a first power transceiver acting as a power source to a user. A skilled person understands that a power transceiver supplies signals as well and power. Therefore the term signal transceiver is used for the purpose of technical clarity so that the skilled person realizes that the 'signal transceiver' is a distinct unit from the 'power transceiver'. And yet the skilled person understands that the 'signal transceiver' transmits and receives power while the 'power transceiver' can supply and receive signals.

Advantageously either the first or second power transceiver can be a power supplier. Advantageously either the first or second power transceiver can be a power user. Advantageously either the first or second signal transceiver can be a power user drawing power from either the first or second power transceiver through this electrical system.

Advantageously the electrical system is effectively modular.

In one embodiment there is a parallel electrical system comprising a first electrical system in parallel with a second electrical system, wherein the first electrical system and the second electrical system are each defined as described above. The third feeds on the first circuits of the first and second electrical systems are connected together and to a power transceiver. The Second feeds on the second circuits of the first and second electrical systems are connected to the power transceiver.

Advantageously with this parallel electrical system twice as much power can be transferred and two independent control signals can be transceived as compared to just one electrical system. Advantageously thereby the second electrical system is effectively a modular addition to the first electrical system drawing power from the same power transceiver. Advantageously additional signal transceivers can be connected to the second electrical system as signal transceivers were connected to the first. These additional signal transceivers can all be arranged to draw power from the same power transceiver.

Preferably the electrical system comprises a first and a second electrical interface terminal block with contacts that provide means to electrically connect other devices to the electrical system. The terminals of the primary coil of the first transformer and also of the primary coil of the third transformer are connected to contacts in the first electrical interface terminal block. The terminals of the primary coil of the second transformer and also of the primary coil of the fourth transformer are connected to contacts in the second electrical interface terminal block.

This enables a first peripheral device connected to the first electrical interface terminal block to communicate via the first and second channels with a second peripheral device connected to the second electrical interface block.

Advantageously while the first peripheral device is communicating with the second peripheral device, the first signal transceiver is also communicating with the second signal transceiver. The peripheral device communication signal is coupled with the signal transceiver communication signal as both signals simultaneously use the first and second channel.

Although there is communication between the first and second signal transceivers, the peripheral device signal is not coupled with the signal transceiver signal at the terminals of the primary coils. Likewise the signal transceiver signal is not coupled with the peripheral device signal at the first feed or the second feed or the third feed.

Therefore advantageously, the signal transceivers operate without interference from the peripheral signals and without interference from the peripheral devices. Similarly and advantageously the peripheral devices operate without interference from signal transceivers operating through their connection the first and second feeds. The AC signal supplied by the signal transceiver at the first and second feeds is not coupled with the peripheral signal sent or received by the peripheral device where the peripheral device is connected to this electrical system.

Advantageously the signal transceivers draw power from the DC power source connected to the third feed and second feed simultaneously as the signal transceivers communicate with each other and the peripheral devices communicate with each other. The DC current and/or voltage are coupled with the AC and peripheral signals on the first and second channels. The DC current and/or voltage supplied by the power transceiver are not coupled with the peripheral signals where the peripheral connects to this electrical system.

In one embodiment the electrical interface terminal blocks comprise sockets with contacts arranged to electrically engage with plug-in devices thereby enabling a first peripheral device plugged into the first socket to communicate via the first and second channels with a second peripheral device plugged into the second socket.

Advantageously a building communication network comprising the electrical system is simpler and cheaper to install. Modern buildings have channels built into them enabling peripheral devices in them to connect to the channels and to communicate easily. The electrical system revealed by the present invention utilizes these channels for the first and second channel.

Advantageously signals at multiple frequencies can be carried and communicated through the electrical system simultaneously. A person skilled in the art will appreciate that the operating frequencies of the various peripheral devices, signal, and power transceivers can be different. Thus a wide bandwidth can be taken advantage of with the electrical system described according to this invention with the various peripheral devices, signal transceivers, and power transceivers communicating simultaneously at the same or different frequencies to meet the needs of a myriad of applications.

The invention is further explained, by way of examples, by the following description, to be read in conjunction with the appended drawings; in which:

DETAILED DESCRIPTION OF PREFERRED EMBODIMENTS OF THE INVENTION

Exemplary embodiments of the invention will now be described in detail with reference to the Figures.

Figure 1:
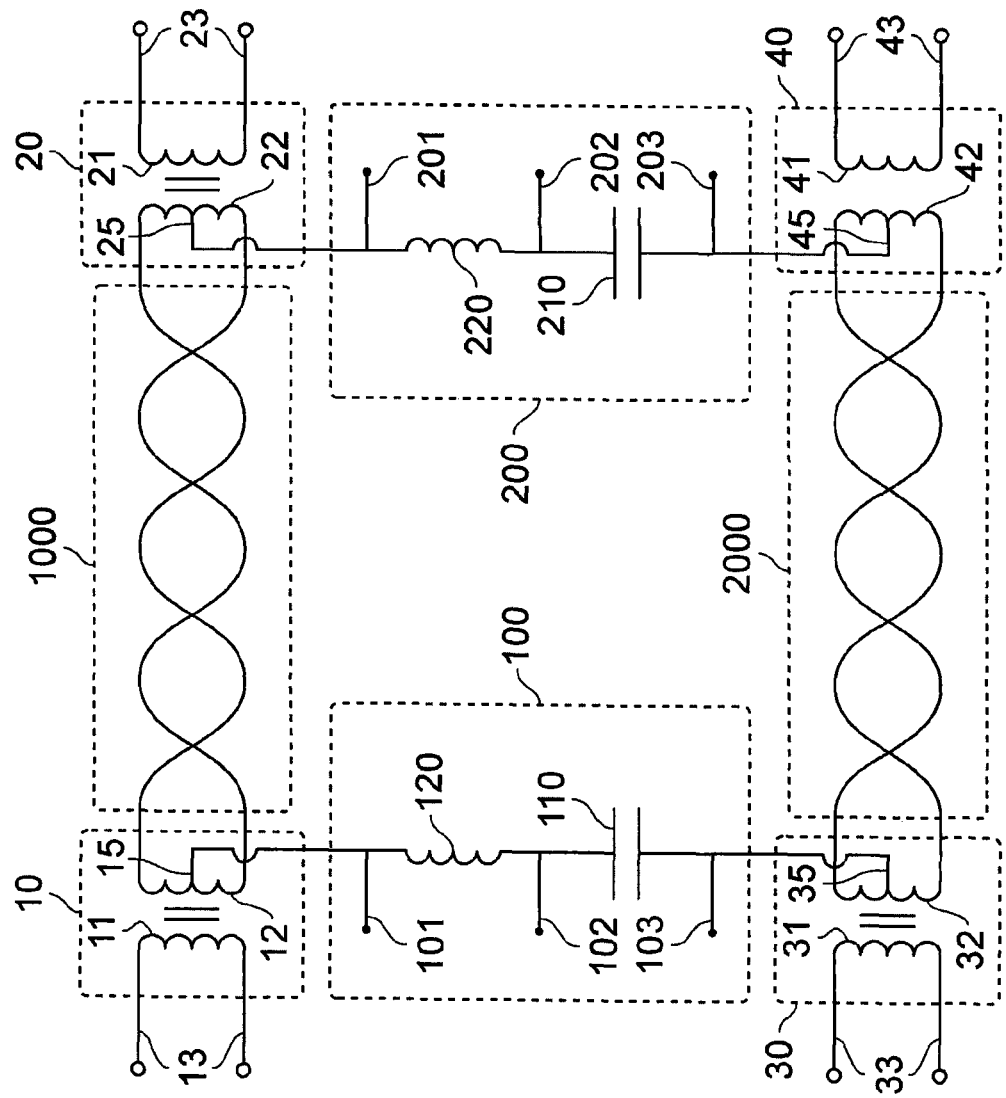
FIG. 1 is an exemplary view of one embodiment of the electrical system according to the invention.

Referring to FIG. 1 an exemplary view of an electrical system comprising four transformers 10, 20, 30, 40, two circuits 100, 200, and two channels 1000, 2000.

The channels provide a conduit for electricity between the four transformers. Both AC electricity and DC electricity are transferred through channels 1000, 2000. Terminals on the secondary coils 12, 22 of the first transformer 10 and second transformer 20 are connected by the first channel 1000. Terminals on the secondary coils 32, 42 of the third transformer 30 and the fourth transformer 40 are connected by the second channel 2000.

Figure 3:
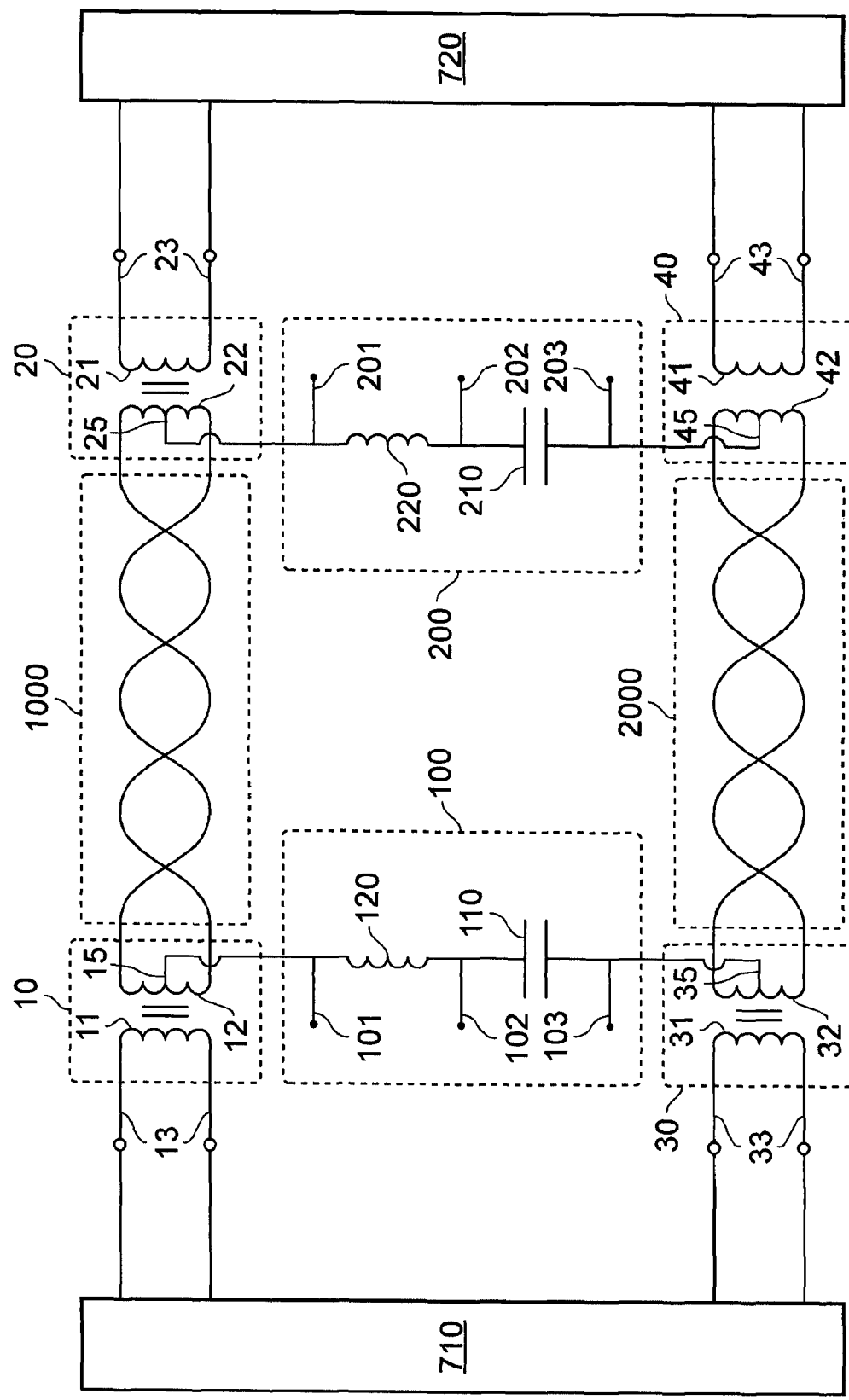
FIG. 3 is an exemplary view showing the electrical system comprising an electrical interface terminal block with peripheral devices connected to it according to the invention.
Figure 7:
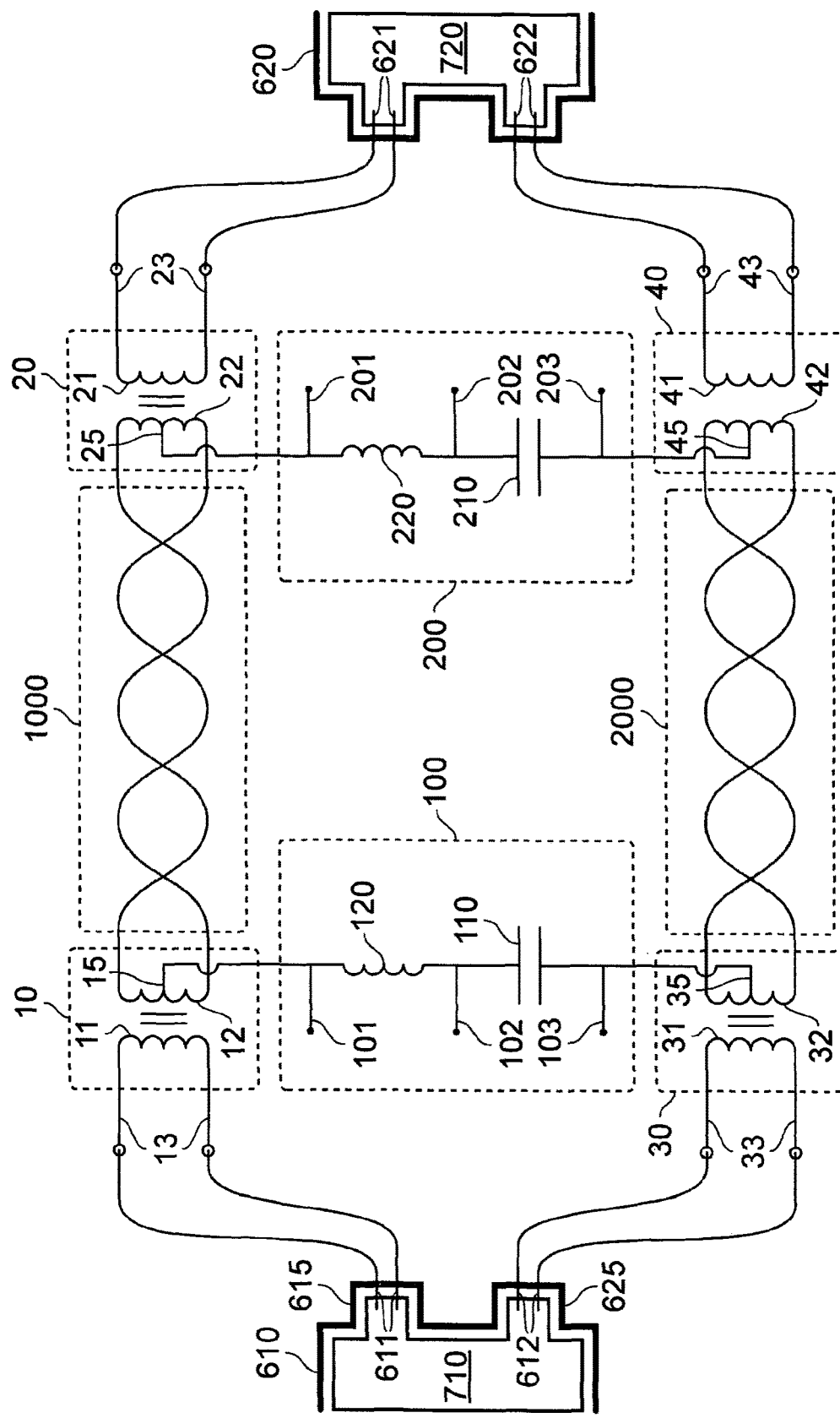
FIG. 7 is an exemplary view showing the electrical system comprising an electrical interface terminal block.

The electrical system enables a variety of peripheral devices to communicate with each other. Computers, printers, stereos, mobile telephone docking stations, electronic cameras, and so forth are typical. Shown in FIGS. 3 and 7 is the peripheral device 710 connected to the primary coils of transformers 10 and 30. Also shown is the peripheral device 720 connected to the primary coils of transformers 20 and 40.

As disclosed in for example US Patent 2011/0055598, it is typical that an electrical device comprises: a transceiver for transmitting and receiving data or power over a network and the device comprises transmit and receive transformers for isolating the transceiver (referred to as "silicon" in FIGS. 10a to 10d) from the network.

Figure 10A:
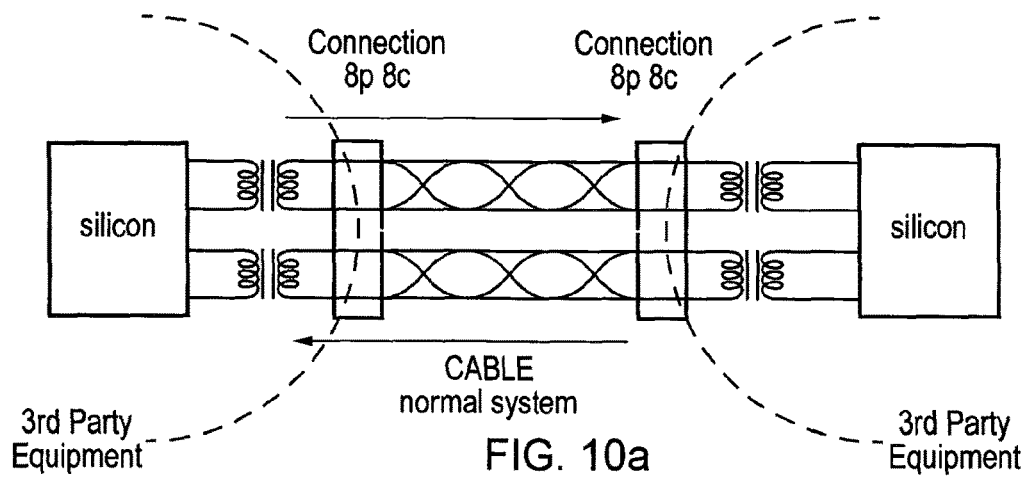
FIG. 10a is typical system showing diagrammatically cables connecting two sets of third party equipment, for example an 'ADSL' port to a computer terminal.

In this case and as shown in FIG. 10a, the channels are connected to the existing transformers for transferring data or power. In contrast, in examples of the present invention, there are provided system transformers 10, 20, 30, 40 in addition to the device transformers.

Figure 10B:
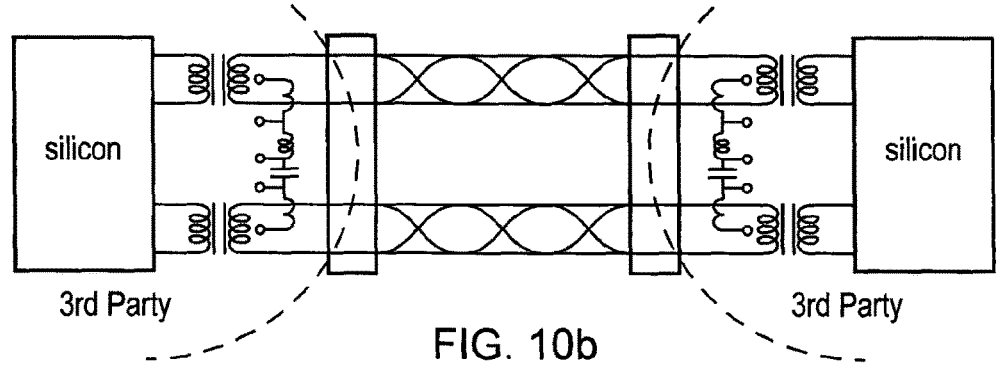
FIG. 10b illustrates diagrammatically use of the invention fitted in third party equipment.
Figure 10C:
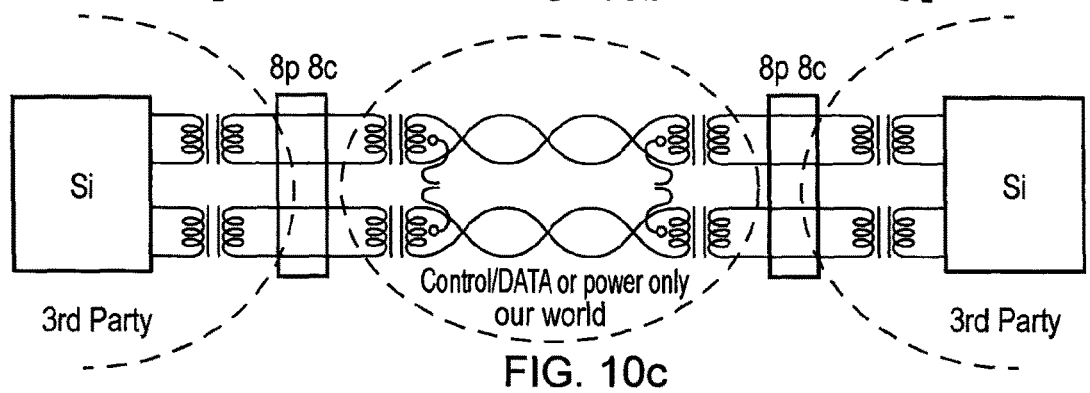
FIG. 10c illustrates use of another embodiment of the invention using 4 sets of transformers to connect systems (without an L-C network) to transmit control signals only or power only.
Figure 10D:
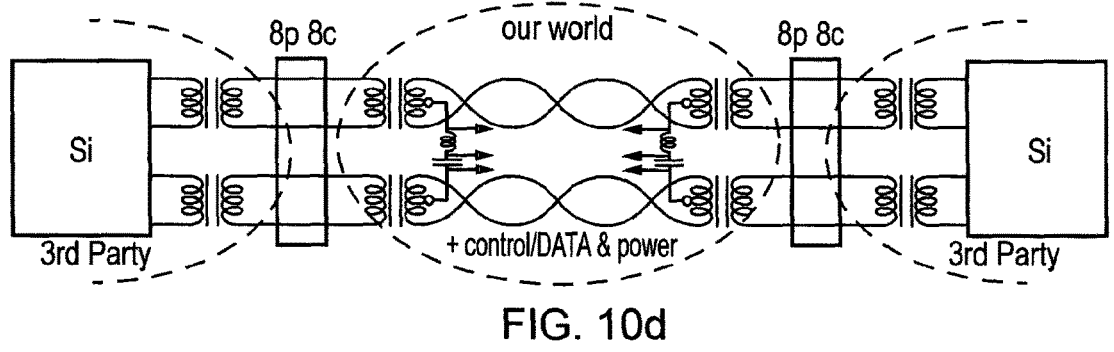
FIG. 10d illustrates use of a further embodiment of the invention using an L-C network and a 4 set transformer configuration to transmit control data and power.

FIG. 10c is an arrangement for the transfer of one of power or data, in which the terminals of the primary coils of transformers 10, 20, 30, 40 are connected to the terminals of the primary coils of the device transformers. This arrangement allows the provision of a passive system (referred to in FIGS. 10c and 10d in broken lines) in which users are isolated from the channels, which is particularly advantageous where the channels are carrying power at relatively high current. In other examples as shown in FIG. 10d an L-C circuit 100, 200 is provided together with additional transformers for enabling the transfer of both power and data.

In yet another arrangement shown in FIG. 10b, the LC circuits 100, 200 can be configured for connection to centre-taps of secondary coils of the existing device transformers for enabling the transmission of power and control data, in addition to the transmission of other data transmitted through the primary coil of the existing transformer.

In a further arrangement, the LC circuits 100, 200 can be configured for connection to centre-taps of secondary coils of the existing device transformers for enabling the transmission of power and control data, in addition to the transmission of other data transmitted through the primary coil of the existing transformer.

FIG. 3 illustrates how two peripheral devices 710 and 720 are connected to the electrical system enabling them to communicate. A first peripheral device 710 is connected to terminals 13, 33 on the primary coils of the first and third transformers 10, 10. A second peripheral device 720 is connected to terminals 23, 43 on the primary coils of the third and fourth transformers.

The first channel is the "send" channel for the first peripheral device 710. The first peripheral device 710 transmits information in the form of an electrical signal. This electrical signal is coupled into the first channel 1000 by first transformer 10. This electrical signal is coupled out of the first channel by the second transformer 20. The second peripheral device 720 receives the transmitted information through its connection to the second transformer 20.

The second channel 2000 is the "receive" channel for the first peripheral device 710. The first peripheral device receives information in the form of an electrical signal through its connection with the third transformer 30. This information is coupled out of this channel 2000 by the third transformer 30. The third transformer receives this information because it is transmitted through the second channel 2000. The information is coupled into the second channel 2000 by the fourth transformer 40. The fourth transformer 40 receives the information in the form of an electrical signal through its connection with the second peripheral device 720.

The symmetry of the electrical system is to be appreciated by a person skilled in the art. Thus the first peripheral device 710 is also able to receive information from the first second peripheral device 720 via the first channel. The first peripheral device 710 is also capable of transmitting information to the second peripheral device 720 through the second channel 2000.

The second peripheral device 720 also transmits and receives information from the first peripheral device by virtue of symmetry of the electrical system.

Secondary coil centre-taps 15, 25, 35, 45 connect the first channel to the second channel. At the centre taps of the first and second transformer, AC signals coupled into the first channel through the primary coils on the first and second transformers are not apparent. And at the centre taps of the third and fourth transformer, AC signals coupled into the second channel through the primary coils of the third and fourth transformer are not apparent. First circuit 100 and second circuit 200 are connected to the centre taps. Therefore AC signals coupled into the first channel via the primary coils do not appear in the second channel. AC signals coupled in the first channel via the primary coils of the first and second transformers do not appear at the terminals of the primary coils of the third and fourth transformers.

Each transformer 10, 20, 30, 40 may be a single unit comprising a centre tap, or they can be made of two transformers with a connection between them forming the centre tap.

Similarly any physical device that meets the inductance or capacitance requirements for the inductors and capacitors described herein this description may be used to build the electrical system according to this invention.

Due to the symmetry of the electrical system AC signals coupled into the second channel via the primary coils do not appear in the first channel. AC signals coupled into the second channel via the primary coils of the third and fourth transformers do not appear at the terminals of the primary coils of the first and second transformers.

An advantage of the electrical system is that communications between the primary coils of the first and second transformers are not present on the terminals of the primary coils of third and fourth transformers.

An advantage of the electrical system is that communications between the primary coils of the third and fourth transformers are not present on the terminals of the primary coils of first and second transformers.

As a consequence of this advantage the information transmitted and received between the first and second peripheral on the first channel is different than the information transmitted between these peripherals on the second channel.

Also as a consequence of this advantage another embodiment of the invention is possible where the first peripheral is connected to the primary terminals of the first transformer only and the second peripheral is connected to the primary terminals of the second transformer only. A third peripheral (not shown) is connected to the primary terminals of the third transformer and a fourth peripheral (not shown) is connected to the primary terminals of the fourth transformer. A signal transferred between the first and second peripheral through the first channel is not mixed with a signal transferred between the third and fourth peripheral through the second channel.

Both the first and second channels 1000 and 2000 can be physically embodied by a single cable comprising two pairs of wires. A standard cat5 cable comprising four twisted wire pairs is an example of such a cable.

Advantageously traditional telephone signals can be carried over any pair of the cable not being utilized as channel of the electrical system.

In the embodiment of the first circuit 100 shown in FIG. 1, it comprises an inductor 120 and a capacitor 110 in series. The second circuit 200 comprises an inductor 220 and a capacitor 210 in series. In one embodiment the capacitance of both capacitors are equal. In one embodiment the inductance of both inductors is equal.

Advantageously an additional transformer such as transformer 10 can be physically connected anywhere along the wires that physically embody first channel. Similarly another additional transformer such as transformer 30 can be physically connected anywhere along the wires that physically embody the second channel. Advantageously the additional transformer and the another additional transformer can be physically connected by another circuit such a first circuit 100. Thus all the advantages of another first circuit can be physically added as to the electrical system that is the invention. By this means, DC power can be put on or taken off at that point in the cable run. Also the AC signal can be interfaced similarly. In both cases the passage of data between the peripheral devices on the network is unaffected.

Advantageously this system is also capable of transmitting AC power either instead of or as well as DC power. If AC power is to be transmitted rather than DC the value of the capacitor 110 is chosen to have a significant impedance at the AC power frequency while at the same time having a very low impedance to the AC signal frequency used for the control data transmission. Likewise the inductor 120 is chosen to have a low impedance to the AC power transmission and a high impedance to the AC control data transmission. Alternatively in the four pair arrangement in FIG. 8 DC power could be transmitted over 1000 and 2000, for example, while AC power could be transmitted over 3000 and 4000.

The first circuit 100 comprises a first feed 101, a second feed 102, and a third feed 103. The second circuit 200 comprises a first feed 201, a second feed 202, and a third feed 203. The term "feed" here denotes a means to connect an electrical instrument such as an AC signal transmitter and/or receiver, or a DC power supplier and/or user to the electrical system.

On the first circuit, the first feed is located between the inductor 120 and the centre tap 15 on the first transformer 10; and the second feed is located between the inductor 120 and the capacitor 110; and the third feed is located between the capacitor 110 and the centre tap on the third transformer 30.

On the second circuit, the first feed 201 is located between the inductor 220 and the centre tap 25 on the first transformer 20; and the second feed 202 is located between the inductor 220 and the capacitor 210; and the third feed 203 is located between the capacitor 210 and the centre tap on the third transformer 30.

In one embodiment the capacitor 110, 210 is embodied by two simple terminals separated by air. In another embodiment the capacitor 110, 210 is an electrolytic capacitor, and in another embodiment it is a ceramic capacitor, and in another embodiment it is a plastic film capacitor.

Figure 2:
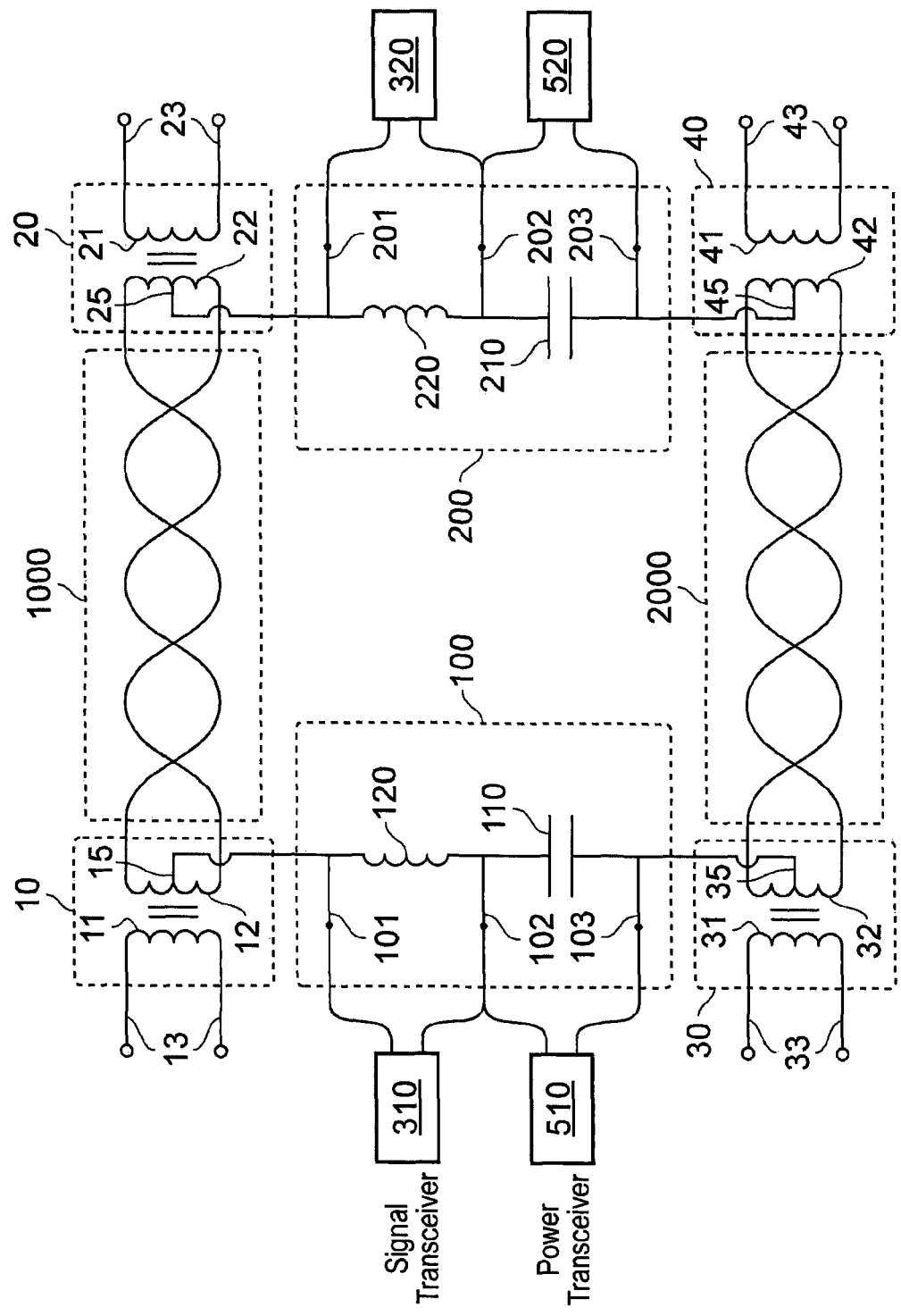
FIG. 2 is an exemplary view showing the electrical system comprising AC and power transceivers that provide AC signals and DC power to and from each other according to the invention.

In one embodiment of the electrical system, referring to FIG. 2, it comprises a first signal transceiver 310 that is connected to the first feed 101 and the second feed 102. At the frequency of operation of the signal transceiver the impedance of the inductor 120 of the first circuit is very high. The impedance is so high that there is effectively an open circuit between the first feed 101 and second feed 102 to the AC signal provided or received by the first signal transceiver 310. Advantageously this high impedance allows this AC signal is efficiently fed into the electrical system by the first signal transceiver or efficiently fed out of the electrical system by the first electrical device.

At the operating frequency of the first signal transceiver 310 the impedance of the inductor 120 is preferably greater than 100 times the input impedance of the first signal transceiver 310 and the feed terminals 101 and 102. That is the ratio is greater than 100:1. In another preferred embodiment the ratio is greater than 1000:1, and in another embodiment the ratio is greater than 1000000:1.

It is to be appreciated that the signal provided by or received by the first signal transceiver cannot and does not appear at the terminals 13, 23, 33, 43 of the primary coils 10, 20, 30, 40.

Instead the signal provided by or received by the first signal transceiver is respectively received by or provided by a second signal transceiver connected to feed terminals 201 and 202 connected to the second circuit. The first feed terminal 201, the second feed terminal 202, and the third feed terminal 203 are connected to the second circuit in the same respective locations the feed terminals of the first circuit are connected.

The impedance of the inductor 220 of the second circuit at the operating frequency of the second signal transceiver 320 is preferably greater than 100 times the input impedance of the second signal transceiver. That is the ratio is greater than 100:1. In another preferred embodiment the ratio is greater than 1000:1, and in another embodiment it is greater than 1,000,000:1.

Advantageously, by virtue of the electrical system, the AC signals are efficiently transferred/received from the first signal transceiver 310 to/from the second signal transceiver 320.

An AC signal provided to the electrical system by the first signal transceiver 310 to the first circuit 100 is coupled into the first channel and into the second channel respectively through the centre tap on the first transformer and the centre tap on the third transformer.

Due to the nature of the centre tap connection the AC signal provided by and/or received by the first signal transceiver 310 is not present at the terminals 13, 23, 33, 43 of the primary coils of the transformers 10, 20, 30, and 40.

Due to the symmetry of the electrical system, the AC signal provided by and/or received by the second signal transceiver 320 is coupled into the first and second channel and is not present at the terminals 13, 23, 33, 43 of the primary coils of the transformers 10, 20, 30, and 40.

In one embodiment the impedance of the capacitor 110, the first circuit is at least 100 times less than the impedance of the inductor 120 at the operating frequency of the signal transceiver 310. That is the ratio is 1:100. In another embodiment the ratio is 1:1000, and in another embodiment it is 1:1,000,000. Consistently, the impedance of the capacitor 210 of the second circuit is at least 100 times less than the impedance of the inductor 220 at the operating frequency of the signal transceiver 320. That is the ratio is 1:100. In another embodiment the ratio is 1:1000, and another embodiment it is 1:1,000,000.

Preferably the signal transceiver of the first circuit 310 and the signal transceiver of the second circuit 320 operate at the same frequency.

Figure 4:
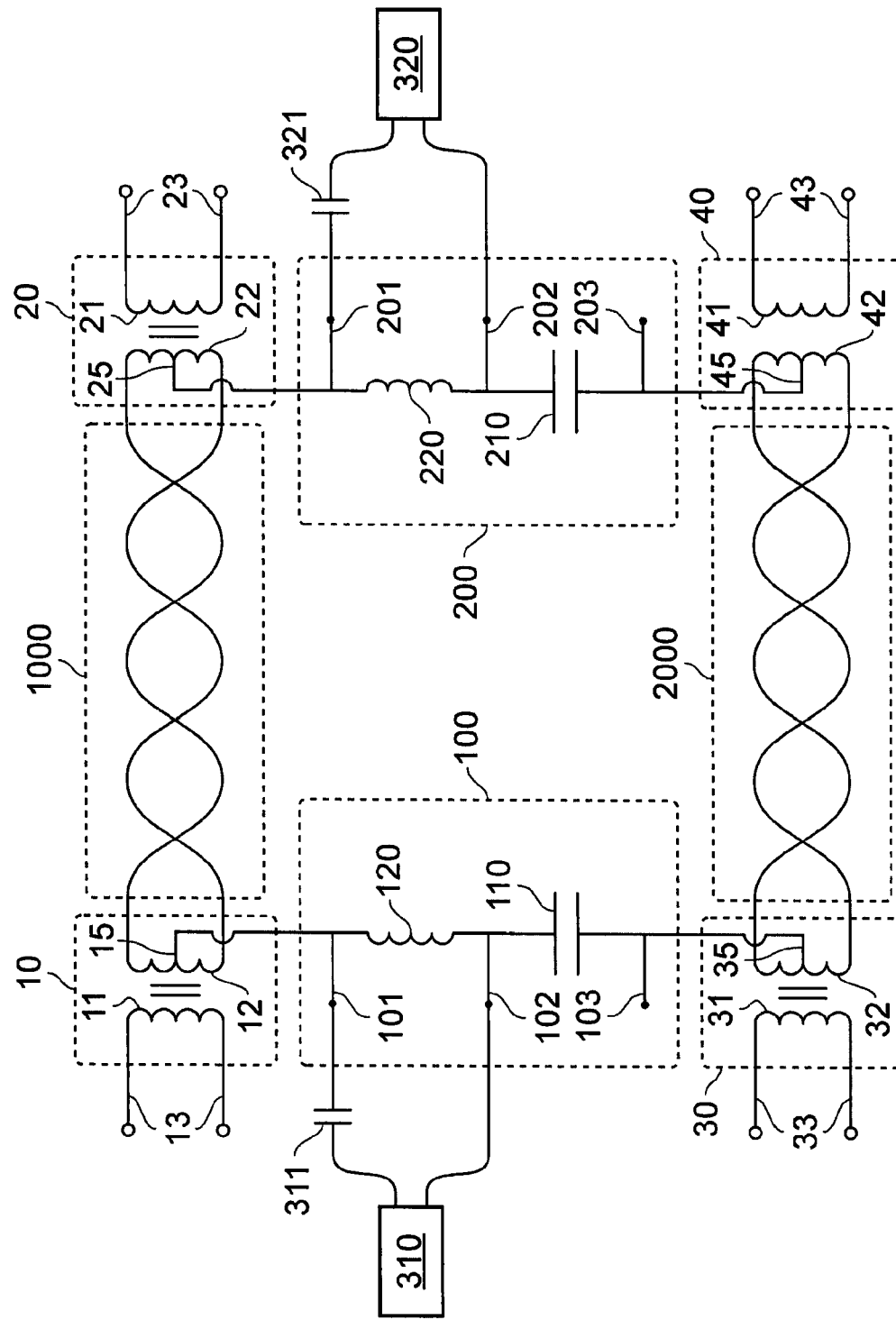
FIG. 4 is an exemplary view showing the electrical system comprising a signal transceiver with a series capacitor according to the invention.

One embodiment of the electrical system, shown in FIG. 4, comprises an signal transceiver 310 connected to the first circuit 100 by a first connection to the second feed 102 and a second connection to a series capacitor 311. In this embodiment the signal transceiver is a configured and arranged to transmit/receive at AC signals at audio frequencies. For high fidelity these audio frequencies range between 25 Hz and 25 KHz. For phone conversations these audio frequencies range between 100 Hz and 2 KHz.

Preferably the capacitance is such that the impedance of the series capacitor at the lowest frequency of the audio frequency range is 100 times less than the output impedance of the signal transceiver 310. Preferably the impedance of the series capacitor at the highest frequency of the audio frequency range is 100 times less that the impedance of inductor 120 at this highest frequency In another embodiment shown in FIG. 4 there is also another signal transceiver 320 connected to the second circuit 200 and a second series capacitor 321. This signal transceiver 320 and series capacitor 321 are connected to the second circuit 200 in the same arrangement that the signal transceiver 310 and series capacitor 311 are connected to the first circuit 100.

Preferably the capacitance of capacitor 321 is such that the impedance of the series capacitor 321 at the lowest frequency of the audio frequency range is 100 times less than the output impedance of the signal transceiver 320. Preferably the impedance of the series capacitor 321 at the highest frequency of the audio frequency range is 100 times less that the impedance of inductor 220 at this highest frequency.

Figure 5:
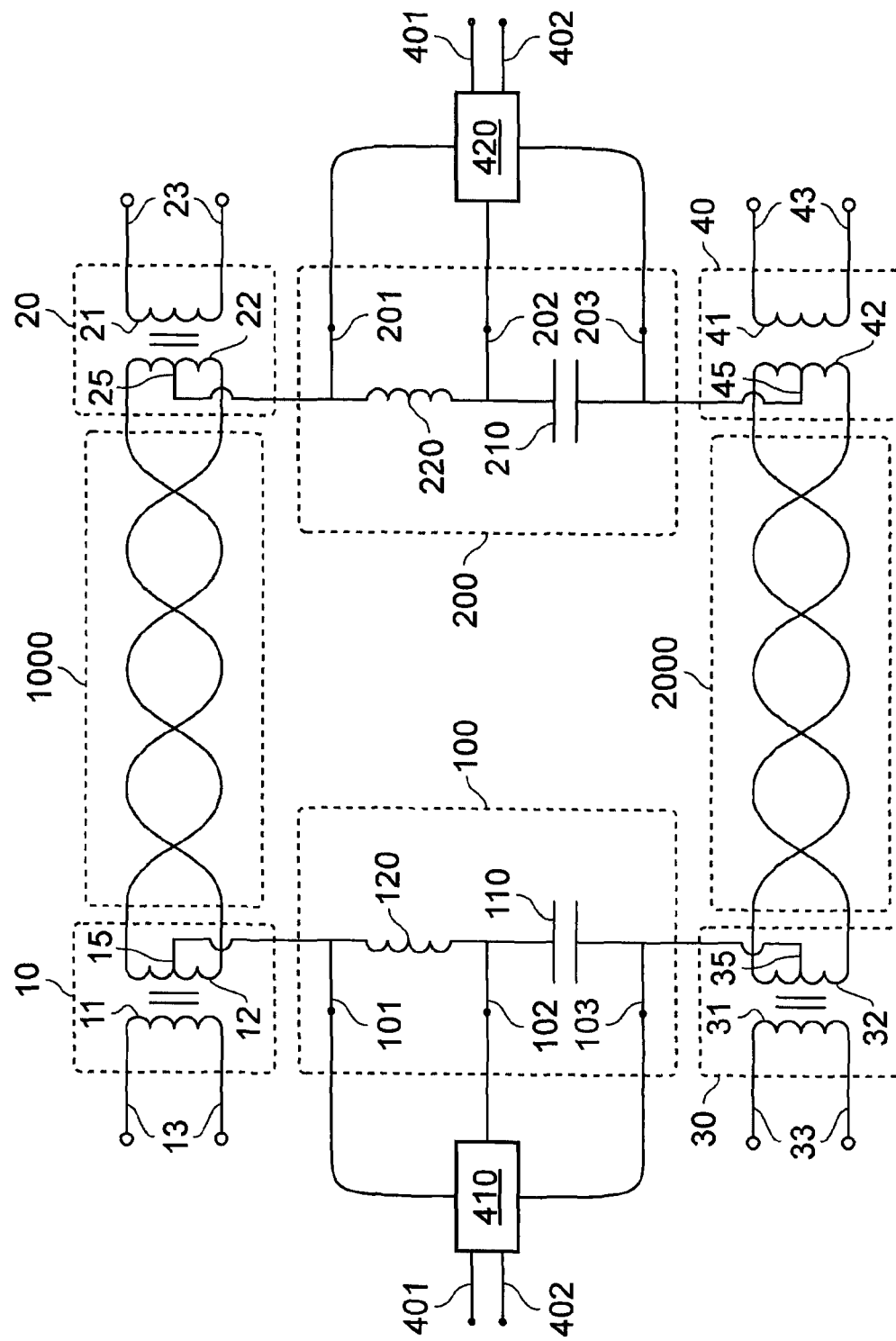
FIG. 5 is an exemplary view showing the electrical system comprising a signal conditioning module.

In one embodiment the electrical system comprises a signal conditioning module 400 which is illustrated in FIG. 5. This signal condition module is connected to the first feed 101, and the second feed 102, and the third feed 103 of the first circuit. The signal conditioning module comprises module terminals 401 and 402 for inputting and outputting signals that have been transmitted received by another signal conditioning module 420 connected to second circuit 200. Advantageously the signal conditioning modules facilitate communication between electronic devices by translating the data format of the signals input/output on their terminals 401 and 402 to another format that is transceived through the electrical system that is easily interpreted and translated by other signal conditioning modules.

A power transceiver 510 shown in FIG. 2 is connected to the second feed 102 and the third feed 103 of first circuit in one embodiment. In one embodiment a power transceiver 520 is connected to the second feed 202 and the third feed 203 of the second circuit.

The power transceiver 510, 520 is an electrical unit that facilitates the take off or provision to, if feasible, of power with a battery, a solar panel, or other device that provides or requires electrical power in the electrical system.

In certain embodiments the power transceiver 510, 520 is combined with the signal transceiver 310, 320 into a single physical device.

DC power supplied to through the second and third feed on the first circuit is coupled into the first and second channels 1000, 2000 through the centre taps 15, 35 on the first and third transformers 10, 30. This DC power is coupled out of the first and second channels through the centre taps 25, 45 on the second and fourth transformers 20, 40.

Therefore power supplied by the power transceiver 510 connected to the first circuit is available to and used by the signal transceiver 310, 320 connected to the first and/or second circuit. And this power is available to and used by a power transceiver 520 connected to the second circuit.

Advantageously because the electrical system is symmetric a power transceiver 520 connected to the second circuit supplies power that is available to and used by the signal transceiver 310, 320 connected to the first and/or second circuit. And this power is available to and used by a power transceiver 510 connected to the first circuit.

The capacitor 110 is in parallel with the power transceiver 510. The impedance of the capacitor 110 at operating frequency of the signal transceiver 310, 320 is much lower than the input impedance of the power transceiver 510. Therefore advantageously the power transceiver 510 provides power to, or draws power from, the first circuit without impeding an AC signal being provided by or used by the signal transceiver 310, 320. Preferably the input impedance of the capacitor 110 is 100 times lower than the input impedance of the power transceiver 510 at the operating frequency of the signal transceiver 310, 320. That is the ratio is 1:100. In another embodiment the ratio is 1:1000, and in another it is 1:1,000,000.

Advantageously because the electrical system is symmetric, the capacitor 210 that is in parallel with power transceiver 520 has the same respective advantages as the capacitor 110. The capacitor 210 also has the same impedance ratio with respect to the input impedance of the power transceiver 220 at the operating frequency of the signal transceiver 310, 320.

Figure 6:
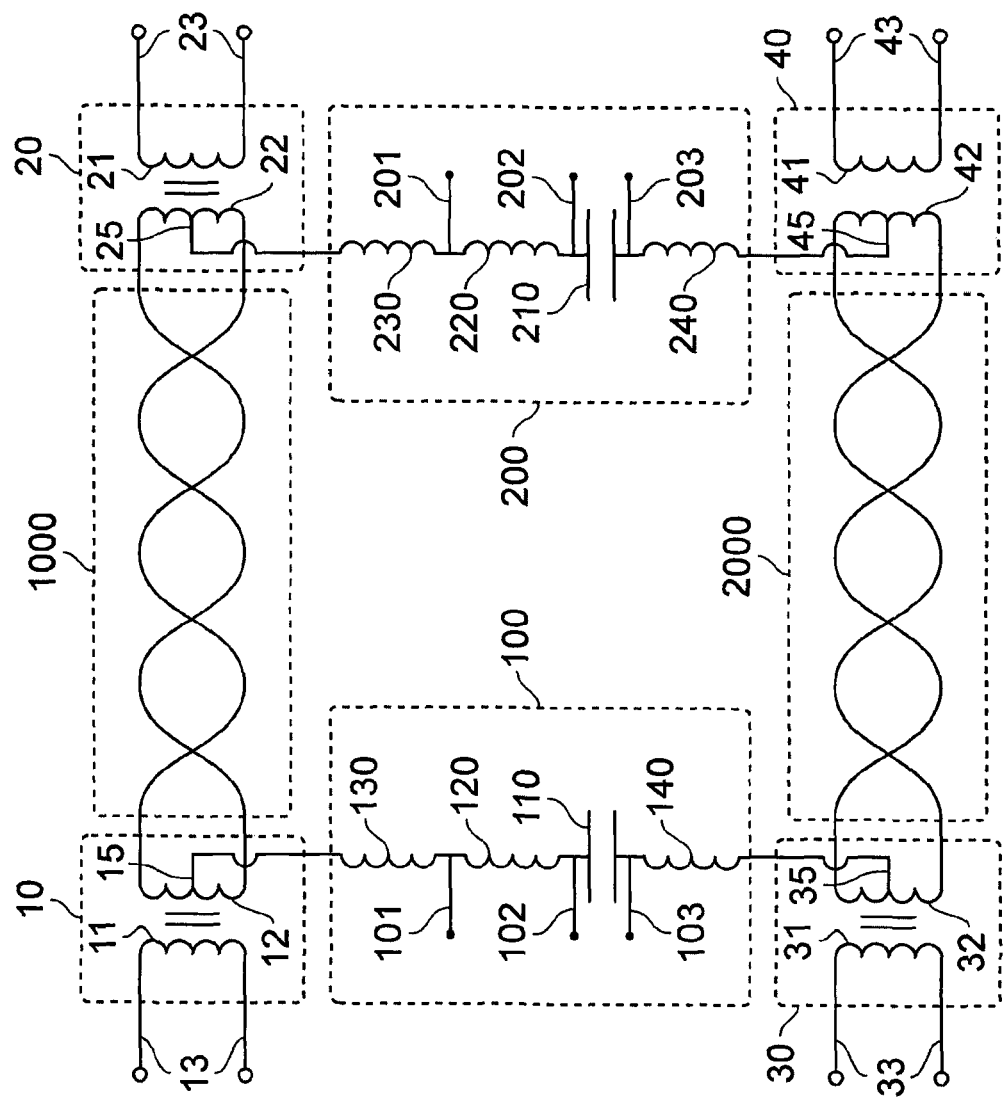
FIG. 6 is an exemplary view showing the electrical system wherein the first and second circuit comprise high frequency inductors according to the invention.

As shown in FIG. 6, in one embodiment the first 100 and second 200 circuits comprise high frequency inductors 130, 140, 230, 240. Therefore the first circuit comprises, in series, the high frequency inductor 130 connected to inductor 120 connected to capacitor 110 connected to the high frequency inductor 140. The second circuit comprises, in series, the high frequency inductor 230 connected to inductor 220 connected to capacitor 210 connected to the high frequency inductor 240.

Instead of the input of the inductor 120 being connected to the centre tap 15 of the first transformer 10 as shown in FIG. 1, the input of the inductor 120 is connected to the output of the high frequency inductor 130. The input of the high frequency inductor 130 is connected to the centre tap 15 on the secondary coil 12. Instead of the output of the capacitor 110 being connected to the centre tap of the transformer 30 as shown in FIG. 1, the output of the capacitor 110 is connected to the input of the high frequency inductor 140. The output of the high frequency inductor 140 is connected to the centre tap 35 on the secondary coil 32. The arrangement and connections of the high frequency inductors 230, 240, the inductor 220, and capacitor 210 in the second circuit are the same at the arrangement and connections of the first circuit as shown in FIG. 6.

The advantages of the high frequency inductors are that the first feed signals are further isolated from interacting with the main channel signals and that the main channel signals are further isolated from interacting with the first feed signals. In both cases the extra resistance introduced by these inductors is negligible to the efficient passage of currents passing through the second feed.

The inductors 130,140,230,240 may be in one embodiment included in the design of the transformers 10, 20, 30, 40. In another embodiment they may be a ferrite bead used as a single turn inductor or another embodiment as a conventional wound inductor.

In one embodiment, illustrated in FIG. 7, the electrical system comprises an electrical interface terminal block 610 connected to the terminals of primary transformers 10 and 30. In one embodiment the electrical system comprises an electrical interface terminal block 620 connected to the terminals of primary transformers 20 and 40.

Peripheral devices 710 and 720 are shown connected to the electrical interface terminal blocks 610 and 620 respectively. Preferably the design and arrangement of the electrical interface terminal blocks are such that peripheral devices simply plug into them.

The electrical interface terminal blocks 610, 620 comprise contacts which are easily connected to by peripheral devices. Examples of such contacts include magnetic contacts, snap to connect contacts, and contacts arranged in sockets 615, 625 shown in FIG. 7 that are compatible with industry standard plugs.

In one embodiment, shown in FIG. 7, the terminals 13 of the primary transformer 11 are connected to contacts 611 in electrical interface terminal block 610. The terminals 33 of the primary transformer 31 are connected to contacts 612 in electrical interface terminal block 610.

In one embodiment the terminals 23 of the primary transformer 21 are connected to contacts 621 in electrical interface terminal block 620. The terminals 43 of the primary transformer 41 are connected to contacts 622 in electrical interface terminal block 620.

Preferably the electrical interface terminal block 610 is distinct from the electrical interface terminal block 620. Therefore a peripheral device 710, connected to electrical interface terminal block 610, can communicate with a peripheral device 720, connected to electrical interface terminal block 620 through the first channel and the second channel.

Preferably the terminal block 610 comprises a socket 615 and terminal block 620 also comprises a socket 625. The contacts 611, 612 are contained in socket 615 and the contacts 621, 622 are contained in socket 625.

Preferably the sockets 615, 625 accept industry, standard plugs for peripheral devices. Advantageously a peripheral device 710 can be plugged into socket 615 and another peripheral device 720 can be plugged into socket 625.

Figure 8:
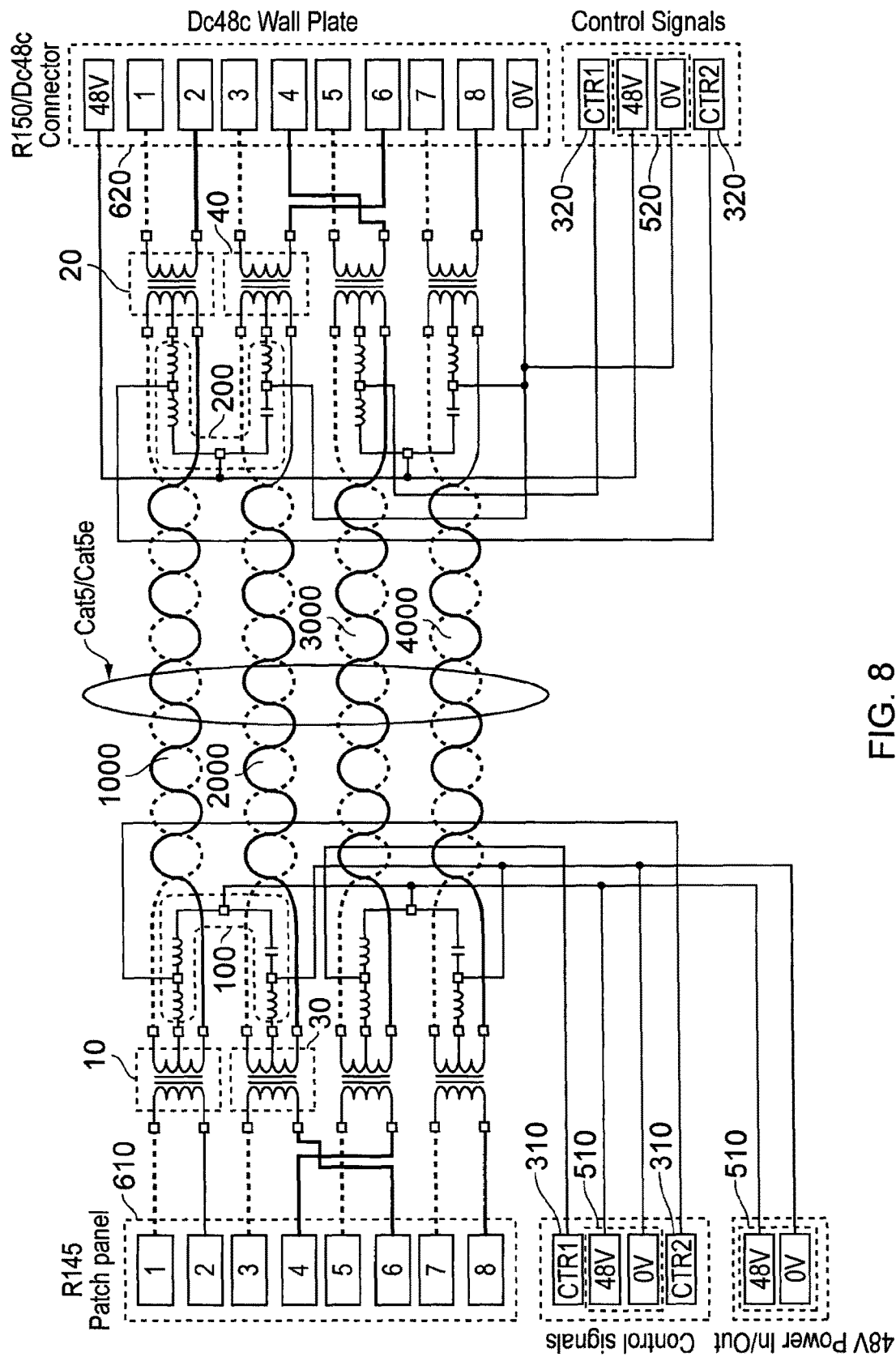
FIG. 8 is an exemplary view showing the parallel arrangement and connection of two electrical systems.

FIG. 8 shows two electrical systems arranged and connected in parallel. FIG. 8 illustrates that a single electrical system is a modular element of a network of electrical elements. A single multi-wire cable can provide the conduit for the first and second channels 1000 and 2000. This cable can also provide the conduit for a third channel 3000 and a fourth channel 4000. More electrical systems and with more channels can be added modularly to the network.

With two electrical systems connected in parallel such as shown in FIG. 8 data transfer rates along the four channels adding up to 1 Gigabit per second, for example, are achievable with the electrical system which is this invention. This high data transfer rate is achievable even while power and signals originating from the feeds 101, 102, 103, 201, 202, 203 on the first and second circuits 100 and 200 are simultaneously transmitted through the channels with the data from the originating with peripherals 710 and 720.

Both AC and DC power can be supplied and received through the feeds 101, 102, 103, 201, 202, and 203 and transmitted through the first and second channels 1000, 2000 according to the electrical system of this invention.

Advantageously with the cable pairs 3000 and 4000 in the same cable sheath, the two similar systems allow for two separate AC control paths and for two separate DC power paths. The DC power paths can be coupled together to reduce the cable resistance thus allowing for greater power transmission capability. The DC power paths may be separate allowing for the transmission at two different voltages.

Figure 9:
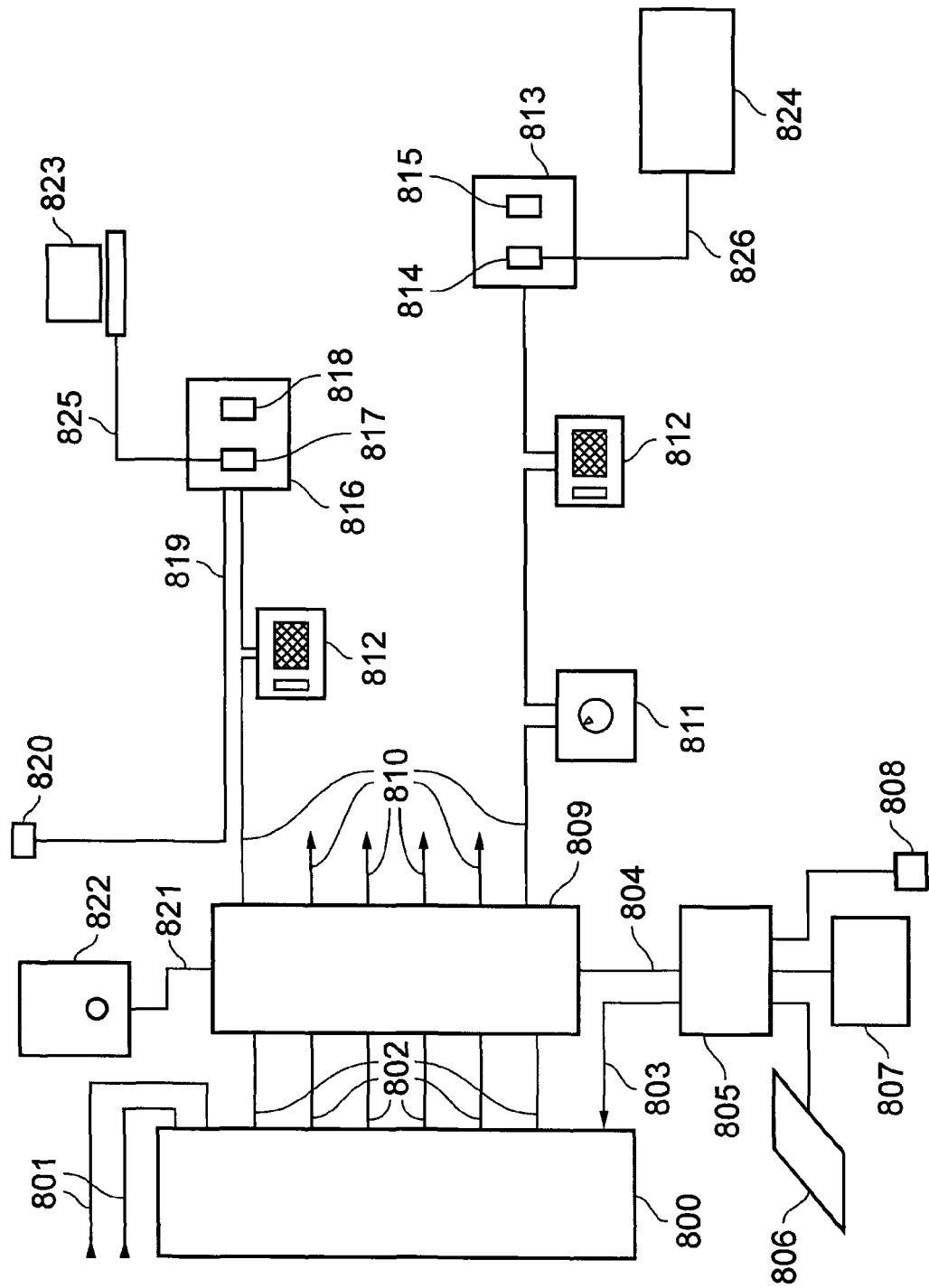
FIG. 9 is an exemplary view showing a total system incorporating the electrical circuit to enable the combined data, control and power distribution function.

Referring to FIG. 9, there is shown an exemplary view of a total system incorporating the electrical circuit to enable the combined data, control and power distribution function.

The core of the system is the multi-channel conditioner 809 which contains a multitude of networks consisting of the elements 10,100 and 30 between the connections 802 and 810. On the connections 802 there is data only and on the connections 810 there is the combined data, control and power signals. Each of the connections 810 comprises a first channel 1000 and a second channel 2000.

The connections 802 go to a standard router 800 which is powered via cable 803 and connected to service providers via cables 801.

The connections 810 go to wall ports 813 and 816. Wall ports 813 and 816 also contain networks consisting of elements 10,100 and 30 and wall ports 813 and 816 contain an electrical interface terminal block such as 610. Thereby the combined data control and power signal on connection 810 is separated at the wall port so that the data is provided to Ethernet connections 814 and 817 respectively.

Connection 814 is shown connected by a cable 826 to a television 824. Here the television 824 is a peripheral such as 720. The cable 826 could be signal only or also have 48 volt power, provided by a power transceiver 510, supplied as well to power the television 824 directly.

The wall port socket 817 is shown connected via cable 825 to computer 823. Here the computer is a peripheral such as 720. The cable 825 could be signal only or also have 48 volt power, provided by a power transceiver 510, supplied as well to power the computer 823 directly.

To illustrate the versatility of the system intercoms 812 and 8122 are shown on two of the 810 connections and contain the elements 10,100 and 30 allowing the separation of the control and power signals required for the operation of the intercom without affecting or interacting with the transmission of the data from the router 800 to wall ports 813 and 816.

Also illustrated is a control system for a boiler. The boiler 822 is connected via a control signal cable 821 to the multi-channel conditioner 809. The control signal will go via 809 to the connection 810 that connects to temperature sensor controller 811 in a room. Advantageously this can be transmitted using the other AC channel 310 available as described in FIG. 8.

A telephone system is also illustrated where the service provider connection 820 is connected to a cable 819 to telephone socket 818 on wall port 816. Note that this cable could alternatively be an isolated pair within cable 810.

The wall port 813 has a USB outlet 815 to provide power to devices such as mobile phones that can be recharged by connecting to the power available from a USB socket. The wall port 813 contains a 48 volt to 5 volt converter.

The power for the total system illustrated by FIG. 9 is provided from a multitude of sources such as a solar panel 806, a battery 807 and a mains supply 808 as well as any other power source distributed throughout the system. The DC power control unit 805 behaves in essence as power transceivers such as 510 and 520 which are connected to a first circuit 100 within the multichannel conditioner 809 via cable 804.

The DC power control unit 805 manages the power from all sources of power and converts as required to 48 volts nominal on the cable 804 and supplies power to router 800 via cable 803. The DC power control unit 805 can receive or transmit power as appropriate from cable 804, battery 807 and mains power 808.

Figure 11:
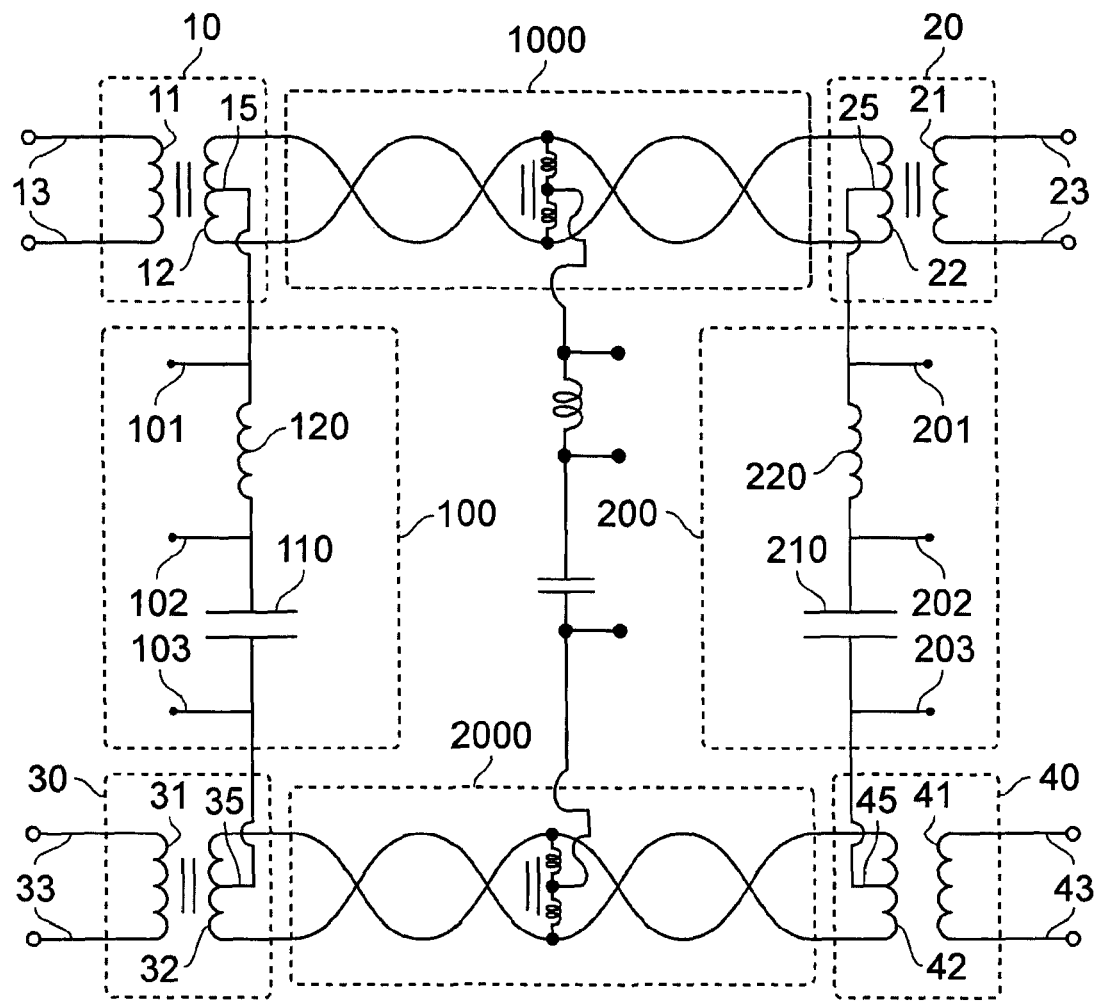
FIG. 11 shows an intermediate circuit corresponding to features 811/812 in FIG. 9.

FIG. 11 shows use of the network in conjunction with a centre tap transformer in a relaying data and power in an intermediate network configuration.

In one embodiment the DC power control unit is connected to earth ground. Therefore the third feed is also connected to earth ground. Advantageously the electrical earth ground connection imparts safety to the electrical system.

The invention has been described by way of examples only. Variations may be made to them without departing from the scope of the invention. Likewise it is understood that several embodiments, with modifications and alternatives have been described. Further embodiments will be apparent to those skilled in the art who have read and understood this description. All such embodiments and modifications are intended to fall within the scope of the present invention as defined in the accompanying claims.

Although the invention has been described with reference to buildings and in domestic or office environments, it will be appreciated that variation may be made to the invention by incorporating an embodiment, such as that shown in FIG. 9, in a power and data network in a vehicle (such as an automobile, truck or bus), a vessel (such as a ship or hovercraft) or in an aircraft. Similarly the invention may be used in distributed switching and signaling systems, for example of the type used in road and rail networks and traffic controllers.

The invention is made clear and further explained in the appended claims.

The invention claimed is:

1. An electrical system for transmission of data or electrical power between electrical devices connected to the electrical system, comprising:
a first transformer and a second transformer having respective secondary coils connected by a first channel;
a third transformer and a fourth transformer having respective secondary coils connected by a second channel,
each of the first transformer, the second transformer, the third transformer, and the fourth transformer having a respective primary coil comprising terminals for connecting with electrical devices connected to the electrical system and receiving or transmitting data to or from the electrical devices;
a centre-tap on the first transformer secondary coil connected through a first electrical circuit to a centre-tap on the third transformer secondary coil; and
a centre-tap on the second transformer secondary coil connected through a second electrical circuit to a centre-tap on the fourth transformer secondary coil;
wherein each of the first electrical circuit and the second electrical circuit comprise at least one feed for transferring data into the electrical system from a source of data or receiving data from the electrical system through the centre-taps of the secondary coils of the first transformer, the second transformer, the third transformer, and the fourth transformer; and
each of the first electrical circuit and the second electrical circuit comprise an inductor in series with a capacitor, said at least one feed being connected to at least one of the inductor and/or the capacitor to allow data to be transferred into or from the electrical system through the centre taps of the first transformer, the second transformer, the third transformer, and the fourth transformer.

2. The electrical system as claimed in claim 1, wherein:
the first transformer, the second transformer, the third transformer, and the fourth transformer are configured to receive data from or transmit data to the electrical devices connected to the electrical system through a transmit or receive transformer of the electrical devices.

3. The electrical system as claimed in claim 1, wherein:
the inductor in series with the capacitor of both the first electrical circuit and the second electrical circuit are connected to said at least one feed to allow power and data to be transferred into or from the electrical system through the centre taps of the first transformer, the second transformer, the third transformer, and the fourth transformer.

4. The electrical system comprising first and second electrical systems as claimed in claim 1, and operated in parallel with one another, wherein:
the respective at least one feeds of the first electrical circuits of the first electrical system and the second electrical system are connected together, and connected to a power transceiver; and
the respective at least one feeds the second electrical circuits of the first electrical system and the second electrical system are connected to the power transceiver.

5. The electrical system as claimed in claim 1, further comprising:
a first electrical interface terminal block and a second electrical interface terminal block with contacts that provide means to electrically connect other devices to the electrical system;
wherein terminals of the primary coil of the first transformer and also of the primary coil of the third transformer are connected to contacts in the first electrical interface terminal block; and terminals of the primary coil of the second transformer and also of the primary coil of the fourth transformer are connected to contacts in the second electrical interface terminal block, thereby enabling a first peripheral device connected to the first electrical interface terminal block to communicate via the first channel and the second channel with a second peripheral device connected to the second electrical interface block.

6. The electrical system as claimed in claim 5, wherein the first electrical interface terminal block and the second electrical interface terminal block each comprise:
a first socket and a second socket each with contacts arranged to electrically engage with plug-in devices, thereby enabling a first peripheral device plugged into the first socket to communicate via the first channel and the second channel with a second peripheral device plugged into the second socket.

7. The electrical system as claimed in claim 1, wherein:
said electrical system is comprised in a communication network.

8. The electrical system as claimed in claim 7, wherein said communication network is comprised in one of:
a vehicle;
a vessel; and
an aircraft.

9. The electrical system as claimed in claim 1, wherein the at least one feed of each of the first electrical circuit and the second electrical circuit further transfers power into the electrical system from a source of power or receives power from the electrical system through the centre-taps of the secondary coils of the first transformer, the second transformer, the third transformer, and the fourth transformer.

10. An electrical system for transmission of data or electrical power between electrical devices connected to the electrical system, comprising:
a first transformer and a second transformer having respective secondary coils connected by a first channel;
a third transformer and a fourth transformer having respective secondary coils connected by a second channel,
each of the first transformer, the second transformer, the third transformer, and the fourth transformer having a respective primary coil comprising terminals for connecting with electrical devices connected to the electrical system and receiving or transmitting data to or from the electrical devices;
a centre-tap on the first transformer secondary coil connected through a first electrical circuit to a centre-tap on the third transformer secondary coil; and
a centre-tap on the second transformer secondary coil connected through a second electrical circuit to a centre-tap on the fourth transformer secondary coil;
wherein each of the first electrical circuit and the second electrical circuit comprise at least one feed for transferring data or power into the electrical system from a source of data or power or receiving data or power from the electrical system through the centre-taps of the secondary coils of the first transformer, the second transformer, the third transformer, and the fourth transformer;

each of the first electrical circuit and the second electrical circuit comprise an inductor or a capacitor connected to said at least one feed to allow power or data to be transferred into or from the electrical system through the centre taps of the first transformer, the second transformer, the third transformer, and the fourth transformer;

wherein an inductor and a capacitor are arranged with said at least one feed to allow power and data to be transferred into or from the electrical system through the centre taps of the first transformer, the second transformer, the third transformer, and the fourth transformer;

wherein the inductor and capacitor are arranged in series; and the at least one feed comprises a first feed and a second feed connected with the inductor and the capacitor for transmitting data and receiving data through the centre-taps, and a third feed which is connected with the second feed, the inductor and the capacitor for transmitting power through the centre-taps.

11. The electrical system as claimed in claim 10, wherein:
a signal input at the first feed and/or the second feed in the first electrical circuit is coupled into the first channel and the second channel, at the first transformer and the third transformer centre tap connections, and is decoupled from the first channel and the second channel, at the second transformer and fourth transformer centre tap connections, and output at the first feed and/or the second feed at of the second electrical circuit.

12. The electrical system as claimed in claim 11, wherein:
the first electrical circuit and the second electrical circuit each further comprise a first respective high frequency inductor connected to one terminal of each respective inductor, and a second respective high frequency inductor connected to one terminal of each respective capacitor.

13. The electrical system as claimed in claim 10, further comprising:
first and second signal transceivers connected to the first feed and the second feed of each of the first electrical circuit and the second electrical circuit.

14. The electrical system as claimed in claim 10, further comprising:
respective first and second power transceivers connected to the respective second feed and the third feed of the first electrical circuit and the second electrical circuit.

15. The electrical system as claimed in claim 10, further comprising:
respective first and second signal conditioning units connected to the first feed, the second feed and the third feed of the first electrical circuit and the second electrical circuit.

* * * * *